Dec. 1, 1959 P. F. HAYNER Re. 24,741

GYROSCOPE

Original Filed Nov. 13, 1953

Paul F. Hayner
INVENTOR.

BY

Attorney

United States Patent Office

Re. 24,741
Reissued Dec. 1, 1959

24,741

GYROSCOPE

Paul F. Hayner, Nashua, N.H., assignor, by mesne assignments, to Sanders Associates, Incorporated, Nashua, N.H., a corporation of Delaware Original No. 2,839,932, dated June 24, 1958, Serial No. 391,981, November 13, 1953. Application for reissue September 30, 1958, Serial No. 764,467

10 Claims. (Cl. 74—5.5)

Matter enclosed in heavy brackets [ ] appears in the original patent but forms no part of this reissue specification; matter printed in italics indicates the additions made by reissue.

This invention relates generally to [gyroscopes] *inertial guidance instruments* and, more particularly, to gyroscopes of the type employed in modern aircraft, guided missiles and the like. It is particularly directed to the provision of a gyroscope which is of exceedingly small size while, at the same time, having an improved performance relative to similar instruments of larger size.

This is a re-issue of U.S. Patent 2,839,932, issued June 24, 1958.

In reducing the size of the gyroscope, while improving its performance, consideration must be given to various factors including the gyro gimbal construction and its mounting system. Moreover, in all gyroscopes of this type, it is highly desirable if not essential that their gimbals be as free as possible from the influence of temperature changes on their relatively movable parts.

It is, therefore, an object of the present invention to provide an improved [gyroscope] *inertial guidance instrument capable of compensating for variations in damping fluid viscosity due to temperature variations.*

More specifically, it is an object of the invention to provide an improved gyroscope with means for minimizing effects of temperature variations upon its movable parts.

Other and further objects will become apparent from the following description.

*In accordance with the invention, there is provided an inertial guidance instrument. The instrument includes a mass member and a housing for the mass member pivotally supporting it for motion about an axis. A viscous fluid within the housing surrounds the member for damping its motion. An expansible, annular member is disposed between the mass member and the housing for decreasing the space between the plastic member and the housing with increases in temperature, thereby minimizing the effects of variations in the viscosity of the fluid.*

In accordance with the embodiment in the present invention, there is provided a gimbal for the gyro rotor with a housing for the gimbal pivotally supporting it and permitting its movement about an axis perpendicular to the rotor's axis of spin. A fluid or viscous liquid, such as oil, is carried within the housing surrounding the gimbal for damping its movement. An annular member, secured to the gimbal, expands with increases in temperature so as to decrease the space between the gimbal and the housing. The changes in the size of the annular member effect a compensation for the variation in the damping factor of the fluid.

For a more detailed description of the present invention, reference may now be made to the following description taken in connection with the accompanying drawing.

Figure 1:
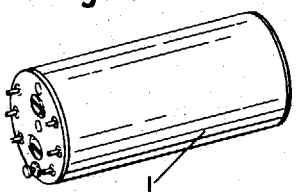
Figure 2:
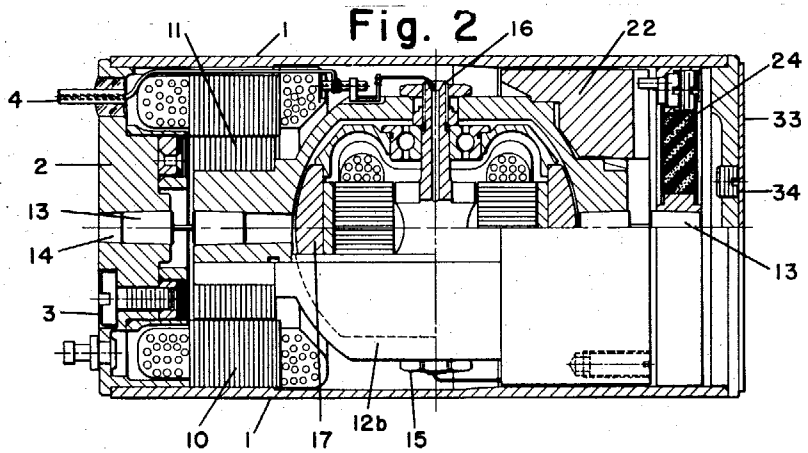

In the drawing, Fig. 1 is a perspective side view of gyroscope embodying the present invention shown in actual size; Fig. 2 is an enlarged, side elevation view, partly in section, of the gyroscope of the present invention; and Fig. 3 is an exploded, perspective view, partly in section, of the gyro shown in Figs. 1 and 2.

Figure 3:
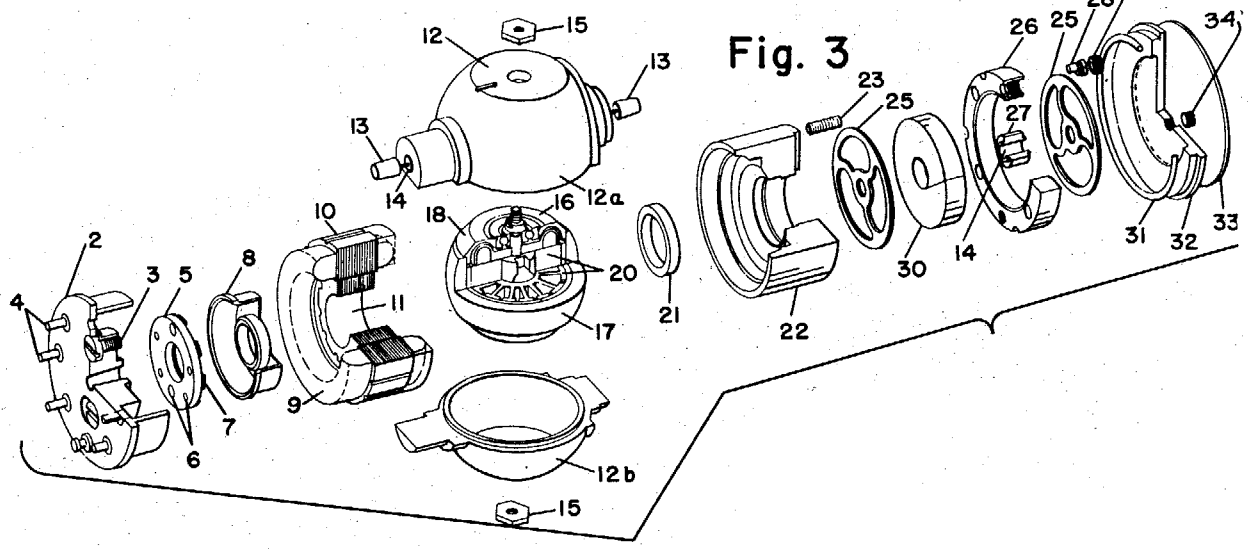

Referring now to the drawing, and particularly to Figs. 2 and 3, the gyro of the present invention is shown comprising a housing or casing 1 of generally cylindrical form having attached at one end, a cap 2 which may be mounted in a suitable place.

Provided in the end cap 2 are adjusting screws 3 and leads 4. An adjusting ring 5 is provided adjacent to the end cap 2 with rivet holes 6 and pick-off adjustment elements 7, as shown. An adjusting sealer 8 is disposed at the opposite side of ring 5, followed by the pick-off windings 9, in which there is disposed a pick-off stator 10 and rotor 11, as shown.

The gimbal 12 is disposed, in a central position in the housing as shown in Fig. 2, and comprises the split upper and lower sections 12a and 12b which are shown in detail in Fig. 3.

Torsion bars 13 are provided at opposite ends of the gimbal. These bars are preferably of an integral, elastic metal construction, in the present embodimnet, beryllium copper. They comprise a narrow central portion which provides the spring restraint, that is, it is capable of an axial twisting movement and enlarged end portions which are integrally formed as a part of the torsion bars for effecting a rigid, strong, and secure support.

Also, for this purpose the enlarged end portions are tapered and the supports in the gimbal in the end cap 2, and the hub or mount 27, of the S-spring assembly, presently to be described, are correspondingly tapered. There is thereby provided rigid and secure supports which permit the rotative movement of the gimbal about the output axis, caused by the angular velocity of the rotor. The torsion bars also provide a restraining torque which resists this angular movement about the output axis and returns the gimbal and rotor to their normal relative angular positions immediately after the input force of the gyro has been removed. Friction is thus essentially eliminated from the output axis of the gyro.

By virtue of these torsion bars no moving bearings are required for the gimbal suspension and both support and centering of the gimbal are accomplished.

The nuts 15 at the top and bottom of the gimbal sections secure the shaft 16 to the rotor 17. The gyro rotor 17 is preferably constructed of a high density material such as tantalum. Suitable retainers and bearings are provided at each end of the rotor shaft. Caps 18 are provided for the rotor at each end thereof. The two sections of the gimbal are retained by the ring 21 and the pick-off rotor 11, as shown.

An annular temperature compensator member of damper cylinder 22, in which several balance screws may be secured, is secured at one end of the gimbal 12. It is this member and its associated parts that comprise features to which the present invention is particularly directed and their function will now be referred to in more detail.

The damping member or cylinder 22 is shaped as shown in the drawing, particularly Fig. 3. It is constructed of a suitable material such as nylon which expands with increasing temperature. This reduces the gap between the member 22 and the housing. The housing is filled with fluid, preferably oil, of the kind commercially available and known as Dow Corning 200 Series Silicone.

The dominant resonance of the gyro (output axis inertia—torsion spring) is damped by the viscous forces from shearing action on the fluid which fills the gap between the gyro case 1 and the member 22.

The usual nominal value of damping provided is in the vicinity of 0.5 to 0.7 critical. A fair latitude of choice is available through the use of fluids of slightly different viscosity.

To facilitate the elimination of heaters and temperature control for many applications, inherent variation of damping with temperature is minimized. Viscosity of the Dow Corning 200 Series Silicone fluids, only doubles for each 50° F. decrease of temperature, the lowest coefficient available in damping fluids.

The member 22 more particularly serves to minimize variations of the damping factor of the fluid in the upper half of the temperature operating range, through a compensating variation of the size of the clearance gap between this member and the case 1. This is accomplished by virtue of the differential expansions between the member 22 and the metal case. As the temperature is raised, a point is reached at which the member 22 rubs and finally seizes on the housing 1 and locks the gimbal 12 in position. This action sets an upper operating temperature limit, for the gyro, though it causes no damage and the gyro can survive appreciably higher temperatures. When the temperature is again brought down within the operating range, the damper member shrinks, releasing the gimbal and normal operation is resumed.

Also, for the purpose of preventing special strain on the torsion bars by different rates of expansion of the parts within the gyro, with temperature changes, there is provided an S-spring assembly 24, at this end of the housing. This assembly comprises a pair of S springs 25 disposed on opposite sides of a ring member 26. A hub element 27, having the tapered support 14, as previously described, holds one enlarged end portion of a torsion bar and is disposed in the S-spring assembly, a pin eccentric 28 and lock 29 being provided as indicated. Within the ring member 26 an annular pressure compensator 30 is disposed. An O ring or gasket 31, a housing-cap 32, and name plate 33 are secured, in the order named, at this end of the housing.

The special S-spring assembly, above described, permits the movable parts of the assembly to be relatively free for longitudinal movement with respect to the housing, while remaining rigidly fixed for transverse forces. Among its other advantages, this arrangement, as above pointed out, compensates for strains caused by different rates of expansion of the parts within the gyro relative to the housing.

The housing may be filled with the liquid through a plug 34 in the plate 33. Under temperature cycling the different rates of expansion of the liquid and the housing are compensated for by the annular member 22 as described above.

Also, the gimbal being immersed in the fluid is given a partially buoyant support which has the effect of reducing its sensitivity to linear acceleration and shock.

It will be seen that the pick-off here provided is basically a differential transformer. The mutual inductance between the primary and secondary of this transformer is varied with the relative angular position of the laminations on the rotor 11. This in turn is effected by the rotation of the gimbal about the output shaft. Thus, this movement is translated into an electrical signal which is proportional to an input angular velocity.

While there has been shown and described a particular embodiment of the present invention, it will be apparent to those skilled in the art that various changes and modifications may be made without departing from the spirit of the invention, and it is therefor intended in the appended claims to cover all such changes and modifications as fall fairly within the spirit and scope of this invention.

What is claimed is:

1. A gyroscope comprising a gimbal; a rotor pivotally supported within said gimbal for rotation about its axis of spin; a housing for said gimbal pivotally supporting it to permit its movement about an axis perpendicular to said axis of spin; oil carried within said housing surrounding said gimbal for damping the movement thereof; an annular member secured to said gimbal and adapted to expand so as to decrease the space between said member and housing with increases in temperature thereby minimizing variations in the damping factor of said oil.

2. A gyroscope comprising a gimbal; a rotor pivotally supported within said gimbal for rotation about its axis of spin; a housing for said gimbal, pivotally supporting it to permit its movement about an axis perpendicular to said axis of spin; a viscous liquid within said housing surrounding said gimbal for damping said movement of said gimbal; and a body of matter disposed between said gimbal and said housing, and adapted to expand with increases in temperature into locking engagement with said housing to lock said gimbal against further rotation when said body reaches a predetermined temperature.

3. A gyroscope comprising a gimbal; a rotor pivotally supported within said gimbal for rotation about its axis of spin; a housing for said gimbal pivotally supporting it to permit its movement about an axis perpendicular to said axis of spin; oil carried within said housing surrounding said gimbal for damping said movement of said gimbal; nylon ring secured to said gimbal for rotation therewith within said housing and adapted to expand thereby to decrease the space between said ring and housing with increases in temperature, thereby minimizing resultant variations in the damping factor of said oil.

4. A gyroscope comprising a gimbal; a rotor pivotally supported within said gimbal for rotation about its axis of spin; a housing for said gimbal, pivotally supporting it to permit its movement about an axis perpendicular to said axis of spin; a viscous liquid within said housing surrounding said gimbal for damping the movement of said gimbal; and a body of matter secured to said gimbal and disposed between said gimbal and housing, said body having a greater coefficient of expansion with temperature increases than said housing for decreasing the space between said body and housing with increases in temperature, thereby minimizing variations in the damping factor of said fluid.

5. A gyroscope comprising: a gimbal; a housing for said gimbal pivotally supporting it for motion about an axis; a viscous liquid within said housing surrounding said gimbal for damping said motion; and a plastic annular member disposed between said gimbal and said housing for decreasing the space between said body and said housing with increases in temperature, thereby minimizing the effects of variations in the viscosity of said liquid.

6. A gyroscope comprising: a gimbal; a housing for said gimbal pivotally supporting it for motion about an axis; a viscous liquid within said housing surrounding said gimbal for damping said motion; and an annular nylon ring secured to said gimbal for movement therewith within said housing for decreasing the space between said ring and said housing with increases in temperature, thereby minimizing the effects of variations in the viscosity of said liquid.

*7. An inertial guidance instrument, comprising: a mass member; a housing for said mass member pivotally supporting it for motion about an axis; a viscous fluid within said housing surrounding said member for damping said motion; and an expansible, plastic annular member disposed between said mass member and said housing for decreasing the space between said plastic member and said housing with increases in temperature, thereby minimizing the effects of variations in the viscosity of said fluid.*

*8. An inertial guidance instrument, comprising: a mass member, a housing for said mass member pivotally supporting it for motion about an axis; a viscous fluid within said housing surrounding said member for damping said motion; and a body of matter disposed between said mass member and said housing, adapted to expand with increases in temperature into locking engagement with said housing to preclude further movement of said*

*mass member when said body reaches a predetermined temperature.*

*9. An inertial guidance instrument, comprising: a mass member, a housing for said mass member pivotally supporting it for motion about an axis; a viscous fluid within said housing surrounding said member for damping said motion; and an expansible, annular, nylon ring member disposed between said mass member and said housing for movement with said mass member within said housing for decreasing the space between said ring member and said housing with increases in temperature, thereby minimizing the effects of variations in the viscosity of said fluid.*

*10. An inertial guidance instrument, comprising: a mass member, a housing for said mass member pivotally supporting it for motion about an axis; a viscous fluid within said housing surrounding said member for damping said motion; and an expansible, annular nylon ring*

*member disposed between said mass member and said housing adapted to expand with increases in temperature into locking engagement with said housing to preclude further movement of said mass member when said body reaches a predetermined temperature.*

References Cited in the file of this patent
or the original patent

UNITED STATES PATENTS

| | | |
|---|---|---|
| 1,407,320 | Bouche | Feb. 21, 1922 |
| 1,743,533 | Davis | Jan. 14, 1930 |
| 1,988,591 | Gillmor | Jan. 22, 1935 |
| 2,013,109 | Reynolds | Sept. 3, 1935 |
| 2,291,612 | Draper | Aug. 4, 1942 |
| 2,357,381 | Carlson | Sept. 5, 1944 |
| 2,672,054 | Warren et al. | Mar. 16, 1954 |
| 2,699,846 | Pitman et al. | Jan. 18, 1955 |
| 2,718,149 | Bamford et al. | Sept. 20, 1955 |